Sept. 1, 1970

D. A. CORTOPASSI 3,526,055

ROW CROP VINE LIFTER

Filed July 26, 1968

INVENTOR.
DEAN A. CORTOPASSI
BY
Webster & Webster
ATTORNEYS

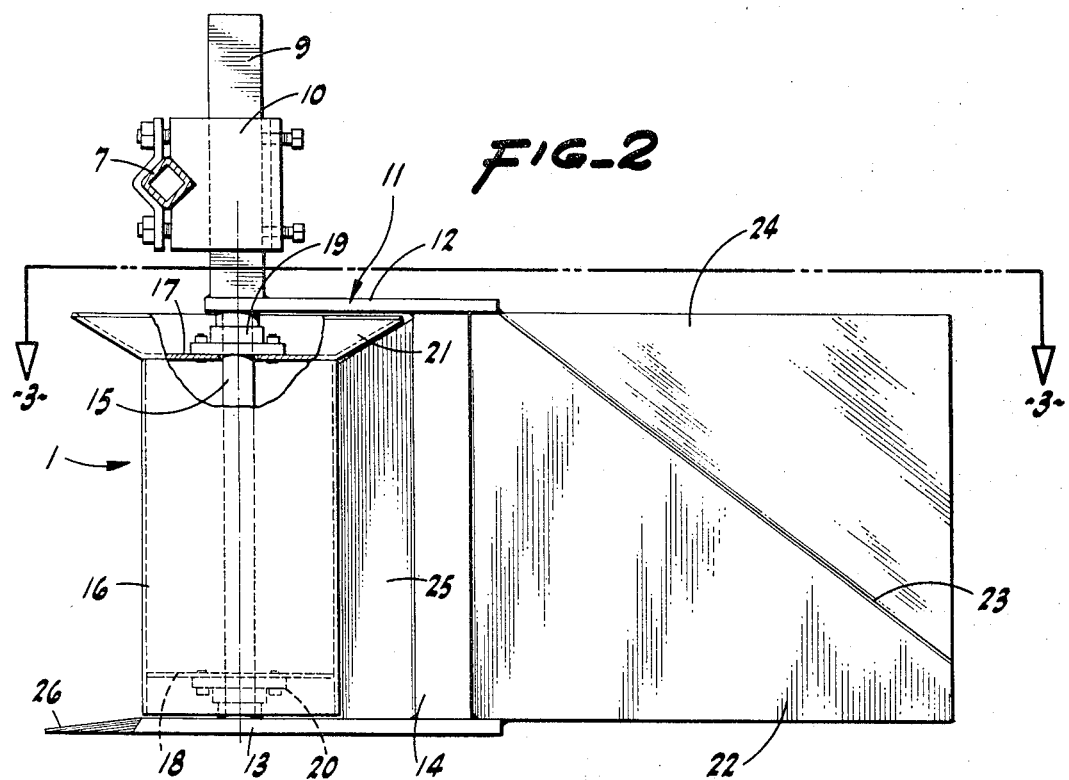
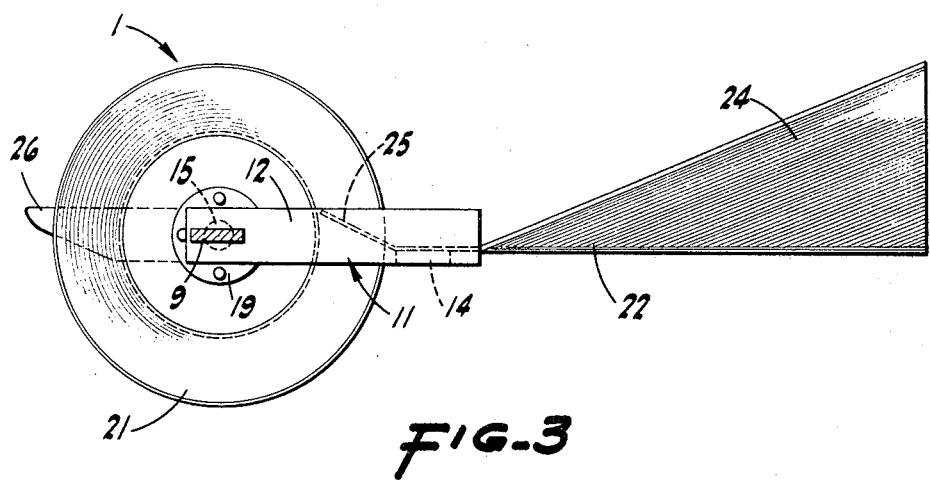

United States Patent Office 3,526,055
Patented Sept. 1, 1970

3,526,055
ROW CROP VINE LIFTER
Dean A. Cortopassi, 11292 N. Alpine Road,
Stockton, Calif. 95205
Filed July 26, 1968, Ser. No. 748,060
Int. Cl. A01b 39/28
U.S. Cl. 47—1                                    4 Claims

ABSTRACT OF THE DISCLOSURE

An agricultural implement—adapted to be tractor-mounted—which includes a vertical axis rotary cylinder, and a combination baffle plate and deflector wing, arranged in an assembly such that—upon advance of the tractor—vines or runners, growing into a furrow from a row of plants on an adjacent longitudinal bed, are effectively turned out of the furrow and onto such bed in intertwined relation to, and for continued growth with, the remainder of the plants.

BACKGROUND OF THE INVENTION

When certain plants, such as tomatoes, are grown on longitudinal row crop beds with furrows therebetween, some of the plant vines or runners always tend to grow into such furrows. This not only impairs the flow of irrigation water in the furrows, but results in fruit loss— by crushing—when the wheels of a tractor (as during cultivation or harvest) run into such furrows. Heretofore, mechanical devices have not been provided to effectively turn the runners out of the furrows and onto the beds, and hand labor for such purpose has been uneconomical by reason of the cost.

SUMMARY OF THE INVENTION

The present invention provides, as a major object, a row crop vine lifter adapted to be tractor-mounted and operative—when used in sets, and as the tractor moves forward with the wheels running in furrows—to turn the plant runners out of the furrows and onto the related plant beds so that such runners then intertwine, and continue to grow, with the remainder of the plants in the rows thereof on said beds.

The present invention provides, as an additional object, a row crop vine lifter for the purpose described, which includes—in novel structural combination—an upstanding freely rotatable cylinder operative, upon advance of the tractor, to engage and cause the plant runners to turn out of the furrow and onto the bed as aforesaid, and a combination baffle plate and deflector wing trailing the cylinder and serving to prevent the turned-out plant runners from falling back into the furrow, but rather causing them to intermingle or entangle with the plants on such row.

The present invention provides, as another object, a row crop vine lifter—of the type and for the purpose described—which is adapted for ready and convenient mounting on a transverse tool bar of a tractor; the vine lifter, as so mounted, being adjustable both laterally of the direction of travel and vertically, selectively, as the spacing of the row crop beds and the depth of the furrows may necessitate.

The present invention provides, as a further object, a row crop vine lifter which is designed for ease and economy of manufacture.

The present invention provides, as a still further object, a practical, reliable, and durable row crop vine lifter and one which is exceedingly effective for the purpose for which it is designed.

BRIEF DESCRIPTION OF THE DRAWINGS

FIG. 2 is an enlarged transverse elevation, partly broken away; the view being taken substantially on line 2—2 of FIG. 1 and showing the structural details of an individual vine lifter.

FIG. 3 is a top plan of such individual vine lifter; the view being taken substantially on line 3—3 of FIG. 2.

DISCRIPTION OF THE PREFERRED EMBODIMENT

Figure 1:
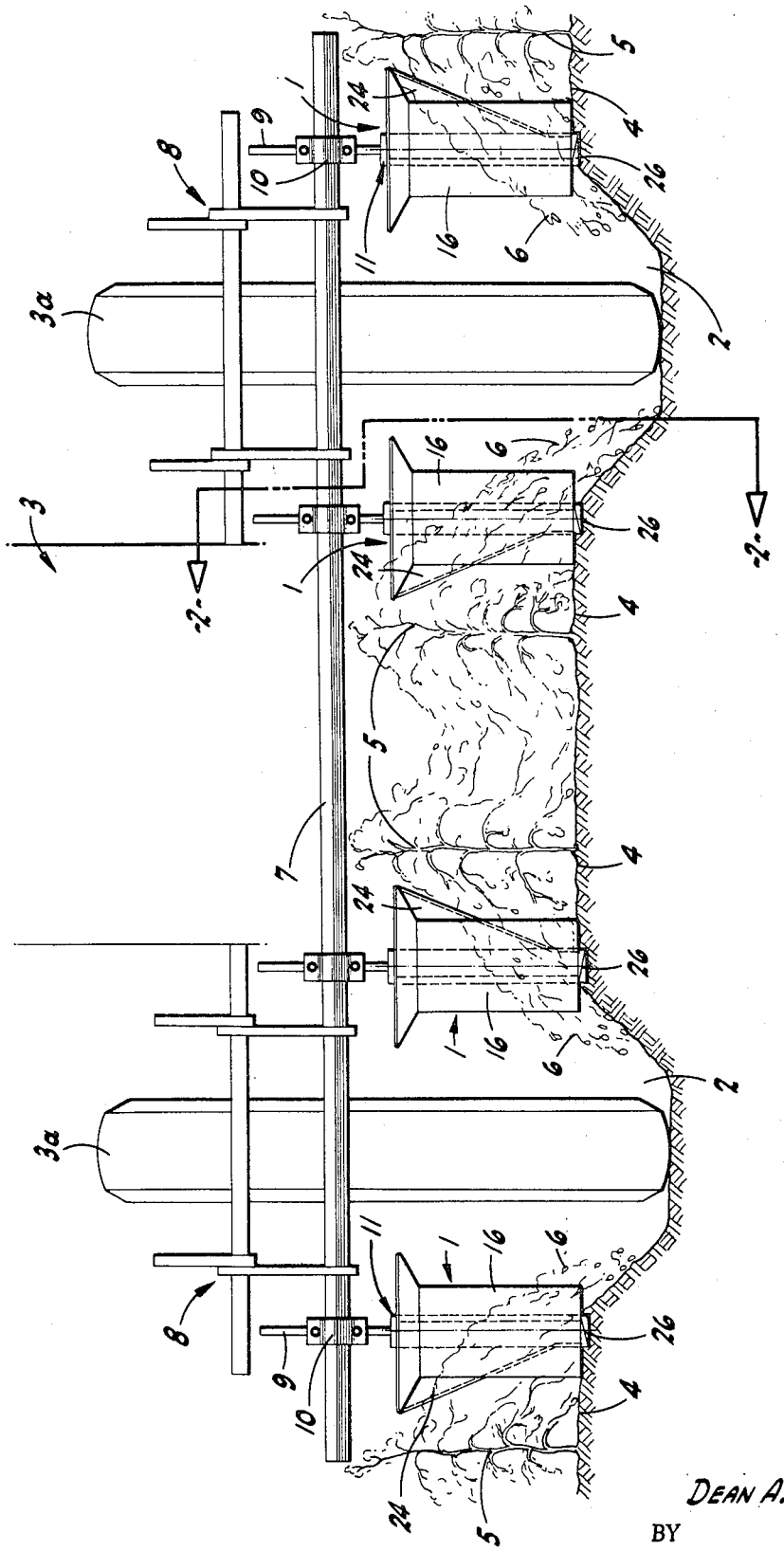
FIG. 1 is a front elevation of two sets of the row crop vine lifters as mounted on the transverse tool bar of a tractor.

Referring now more particularly to the drawings and to the characters of reference marked thereon, each vine lifter is shown generally at 1; there being a set of two of such vine lifters used in relation to each furrow 2. The vine lifters 1 of each such set are spaced apart—when mounted on a tractor 3 (having wheels 3a which run in the furrows 2) in the manner hereinafter described—such that said vine lifters occupy a position directly above the related shoulder of the corresponding row crop bed 4.

Each bed 4 has a longitudinal row of plants 5 growing thereon, and from such plants vines or runners 6 grow over the shoulders of the bed and into the furrow 2. It is the purpose of the present invention to provide vine lifters 1 which are effective—upon advance of the tractor—to turn the plant runners 6 out of the furrow 2 and onto the beds 4 in intermingled or entangled relation with the plants 5 growing on such beds.

Each vine lifter 1 is laterally and vertically adjustably mounted in connection with, and depends from a transverse tool bar 7 supported from tractor 3 by an attachment structure indicated generally at 8; there being a standard 9 included in and projecting upwardly from each vine lifter and being secured to the transverse tool bar 7 by a clamp 10.

At the lower end thereof, each standard 9 is rigidly secured to a generally U-shaped forwardly opening rigid frame 11; such frame including a longitudinal top bar 12, a longitudinal bottom bar 13, and a rear post 14 connected between such bars.

A spindle 15 is fixed in connection with, and spans vertically between, the forward end of the top bar 12 and the bottom bar 13; such spindle being surrounded in rotary concentric relation by a substantially full-height cylinder 16. The rotary cylinder 16 includes a top plate 17 and a bottom plate 18; such plates carrying bearings 19 and 20 which journal said cylinder 16 on the spindle 15.

The rotary cylinder 16 is straight-sided from the bottom to adjacent the top, but at the top is formed with an enlarged upwardly and outwardly flared foliage-stop flange 21.

A longitudinally extending, upstanding baffle plate 22, of substantially the same height as the frame 11, is fixed in connection with the rear portion thereof and in the main projects rearwardly therefrom. Such baffle plate is bent along line 23 to form on said plate a generally triangular, laterally outwardly projecting deflector wing 24; the latter, which is forwardly and upwardly inclined, progressively increasing in width from its forward end and overhanging the related bed 4.

The immediate front end portion of the baffle plate 22 (i.e. the portion thereof ahead of the rear post 14) is bent laterally to define a vertical scraper flange 25 canted away from the longitudinal radial plane of the cylinder 16; such flange 25 substantially matchingly engaging said cylinder in order to maintain it in clean condition.

In the present embodiment, the longitudinal bottom bar 13 is extended forwardly as a point 26 which projects a short distance ahead of the lower end of the cylinder 16.

In use, the above described vine lifter is, as hereinbefore noted, used in a set of two thereof for each furrow 2 and the related beds 4; such vine lifters being set so that the rotary cylinders 16 ride along the shoulders of the beds but partially overhanging the furrow. Also, each vine lifter is vertically adjusted so that its rotary cylinder 16 runs at the bottom close to the top surface of the adjacent bed 4.

As the tractor 3 moves forward, with the wheels 3a running in the furrows 2, each vine lifter 1 functions in the following manner:

The plant runners 6, as they are engaged by the advancing rotary cylinder 16, are turned by such cylinder out of the furrow 2 and onto the bed 4; this occurring by reason of the fact that the runners 6 are, because of their attachment to plants 5, in effect anchored at their inner ends and hence cause to drag or pull about the advancing cylinder.

As the rotary cylinder continues to advance, the runners 6, as turned onto the bed 4, are prevented from falling back into the furrow by the baffle plate 22; the deflector wing 24 at the same time acting to roll the turned-out runners onto said plants on the bed 4.

Preferably, the operation is conducted at a time when the runners 6 have small but green fruit thereon in order that such fruit will help to hold the runners 6 in their new lie intertwined or tucked with the plants 5.

If desired, to aid in the engagement of the runners 6 with the advancing cylinder 16, a point 26 may be provided on the front end of the bottom bar 13; such point 26 running in the soil at the top of the bed at the shoulder thereof and passing beneath the runners 6 immediately prior to their engagement with the cylinder.

With the vine lifters 1—each constructed, mounted, and functioning as described—plant runners growing from row crop beds into irrigation furrows can be readily and mechanically turned out of the furrows and onto the beds where such runners are intermingled with the plants growing along the beds and thus held against falling back into the furrows.

From the foregoing description, it will be readily seen that there has been produced such a row crop vine lifter as substantially fulfills the objects of the invention, as set forth herein.

While this specification sets forth in detail the present and preferred construction of the row crop vine lifter, still in practice such deviations from such detail may be resorted to as do not form a departure from the spirit of the invention.

I claim:

1. A row crop vine lifter, adapter to be mounted on a tractor having wheels which run in furrows between row crop beds, comprising a frame, means tractor-mounting the frame in a predetermined position relative to such a bed, an upstanding freely rotatable cylinder journaled on the frame in position to engage plant runners growing into the adjacent furrow from plants on said bed, the cylinders being operative upon advance of the tractor to cause the runners to turn out of the furrow in the direction of the plants on said bed, and means on the frame rearwardly of the cylinder arranged to prevent the plant runners from falling back into the furrow while deflecting such runners into intermingling relation with said plants on the bed; said means comprising a longitudinally extending upstanding baffle plate mounted on the frame and projecting rearwardly from immediately adjacent the cylinder, a portion of said baffle plate being angularly disposed to define a laterally outwardly projecting, forwardly and upwardly inclined, deflector wing, and the inner edge of said deflector wing having its front end inception at the upper edge of the baffle plate, and its rear end termination adjacent the lower edge of such baffle plate.

2. A row crop vine lifter, adapted to be mounted on a tractor having wheels which run in furrows between row crop beds, comprising a frame, means tractor-mounting the frame in a predetermined position relative to such a bed, an upstanding freely rotatable cylinder journaled on the frame in position to engage plant runners growing into the adjacent furrow from plants on said bed, the cylinder being operative upon advance of the tractor to cause the runners to turn out of the furrow in the direction of the plants on said bed, and means on the frame rearwardly of the cylinder arranged to prevent the plant runners from falling back into the furrow while deflecting such runners into intermingling relation with said plants on the bed, the frame being generally U-shaped with the open end forward, the frame including a longitudinal top bar and a longitudinal bottom bar connected in vertically spaced relation by a rear post, and an attachment standard fixed on and upstanding from the top bar; the cylinder being journaled in the frame at such open end thereof between said bars and ahead of said rear post, and said means including a longitudinally extending, upstanding baffle plate mounted on the frame and projecting rearwardly from immediately adjacent the cylinder, the portion of the baffle plate between said rear post and the cylinder being horizontally canted to define a vertical flange disposed in forwardly diverging relation from said rear post and in the direction of the row crop bed.

3. A row crop vine lifter, adapted to be mounted on a tractor having wheels which run in furrows between row crop beds, comprising a frame, means tractor-mounting the frame in a predetermined position relative to such a bed, an upstanding freely rotatable cylinder journaled on the frame in position to engage plant runners growing into the adjacent furrow from plants on said bed, the cylinder being operative upon advance of the tractor to cause the runners to turn out of the furrow in the direction of the plants on said bed, and means on the frame rearwardly of the cylinder arranged to prevent the plant runners from falling back into the furrow while deflecting such runners into intermingling relation with said plants on the bed; said means comprising a longitudinally extending, upstanding baffle plate mounted on the frame and projecting rearwardly from immediately adjacent the cylinder, the frame being generally U-shaped with the open end forward, the cylinder being journaled in the frame at such open end thereof; a portion of said baffle plate being angularly disposed to define a laterally outwardly projecting, forwardly and upwardly inclined, deflector wing.

4. A row crop vine lifter, as in claim 3, in which the generally U-shaped frame includes a longitudinal bottom bar; there being a plant runner pick-up point projecting ahead of the lower end of the cylinder from the forward end of such bottom bar for advance beneath the plant runners and as an aid to engagement thereof with said cylinder.

References Cited

UNITED STATES PATENTS

| | | | |
|---|---|---|---|
| 2,064,480 | 12/1936 | Lock et al. | 172—517 XR |
| 2,210,219 | 8/1940 | Sievers et al. | 56—119 |
| 2,225,516 | 12/1940 | Audilet | 172—517 |
| 2,723,521 | 11/1955 | Karlsson | 56—119 |
| 2,738,638 | 3/1956 | Pool et al. | 56—119 |
| 3,277,605 | 10/1966 | O'Brien | 47—1 |
| 3,387,666 | 6/1968 | Hadfield | 172—20 |

ROBERT E. BAGWILL, Primary Examiner

U.S. Cl. X.R.

56—119, 327; 172—517